Feb. 27, 1923.  1,446,820

F. D. BABCOCK

NONWRECKER

Filed Oct. 27, 1922  2 sheets-sheet 1

WITNESSES
Guy M. Spring
Frank Fraser

Inventor
FLORAIN D. BABCOCK

Richard B. Owen
Attorney

Feb. 27, 1923.
F. D. BABCOCK
NONWRECKER
Filed Oct. 27, 1922
1,446,820
2 sheets-sheet 2
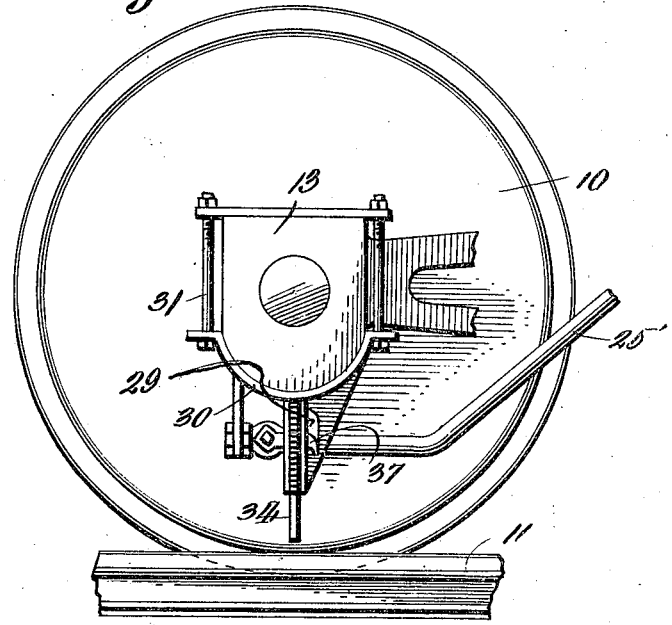
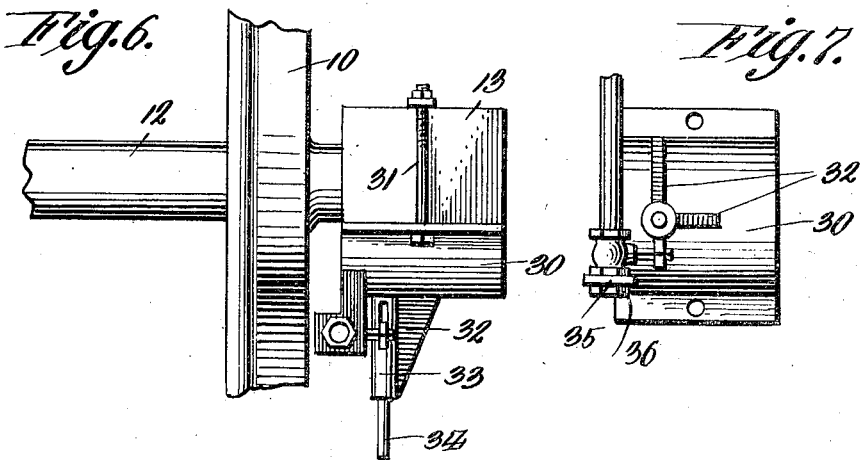
WITNESSES
Inventor
FLORAIN D. BABCOCK Patented Feb. 27, 1923.

1,446,820

UNITED STATES PATENT OFFICE.

FLORIAN D. BABCOCK, OF IOWA FALLS, IOWA.

NONWRECKER.

Application filed October 27, 1922. Serial No. 597,319.

*To all whom it may concern:*

Be it known that I, FLORIAN D. BABCOCK, a citizen of the United States, residing at Iowa Falls, in the county of Hardin and State of Iowa, have invented certain new and useful Improvements in Nonwreckers, of which the following is a specification.

My invention relates to a non-wrecker or safety device which is used in conjunction with steam cars or the like, and which is adapted to apply the air brakes in times of an emergency.

An object of my invention is to provide a non-wrecker or safety device which is adapted to be placed on a vehicle that runs on a track, and in which an air brake is used, which will automatically set the brakes when the vehicle becomes derailed.

A further object of my invention is to provide a non-wrecker or safety device which is adapted to be mounted on any form of vehicle now in use without remodification of said vehicle.

A further object of my invention is to provide a non-wrecker or safety device that is strong, durable, simple and inexpensive in construction, and that is especially well adapted to the use for which it is designed.

Other objects and advantages of the invention will become apparent in the course of the following description.

Figure 1:
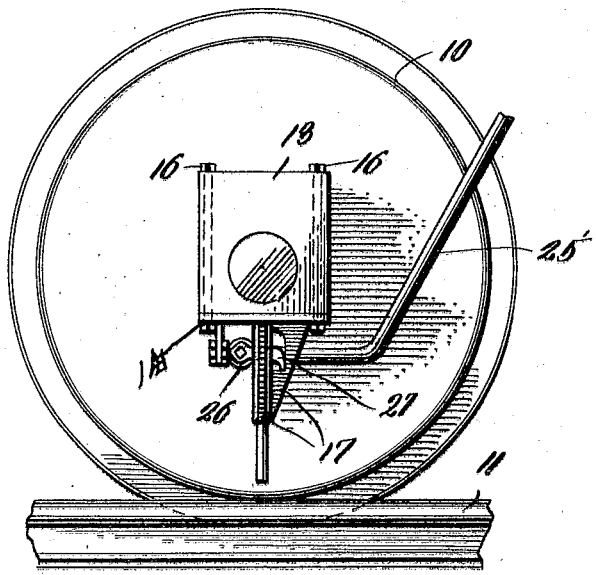
Figure 3:
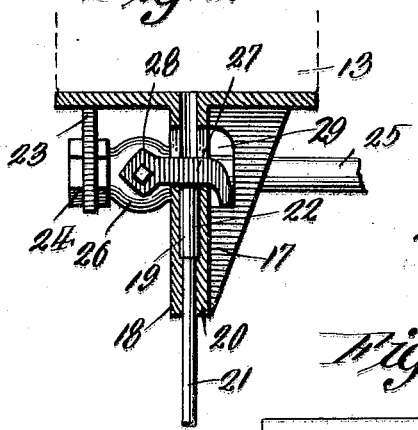
Figure 2:
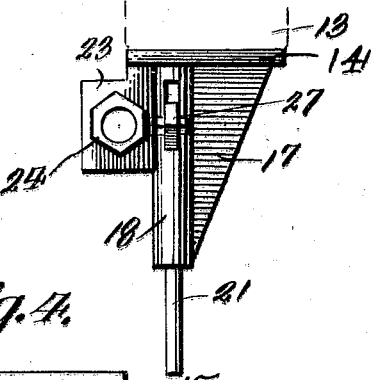
Figure 4:
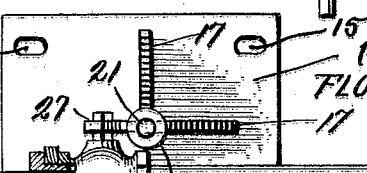

In the drawings, wherein like numerals are employed to designate like parts throughout the same, Figure 1 is a front elevation of apparatus embodying my invention in use, Figure 2 is an end view of the same, Figure 3 is a longitudinal section taken through my invention, Figure 4 is a bottom plan view of the device, Figure 5 is a front plan view of a modification of my invention, Figure 6 is an end view of the same, and Figure 7 is a bottom plan view thereof.

In the drawings, wherein for the purpose of illustration is shown a preferred embodiment of my invention, the numeral 10 designates a vehicle wheel, which is adapted to run on a track 11. The wheels 10 are mounted on an axle 12 which is provided at its end with the ordinary boxings 13. My invention comprises a plate 14 which is provided with openings 15 through which are adapted to run or pass suitable bolts 16 which are adapted to embrace the axle box 13, so as to hold the plate 14 and adjuncts in place. As is shown in Figure 1 of the drawings, the plate is a substantially flat plate.

As is clearly shown in the drawings, depending brackets or arms 17 are formed integral with the substantially rectangular flat plate 14, and terminate in a sleeve 18, which is provided with a suitable bore 19, which is reduced in size at its lower end forming a smaller bore 20. A pin 21 having the enlarged end 22, mounted in the bore 19, is prevented from dropping therefrom by reason of the enlarged end 22 of the pin 21 striking the shoulder of the reduced bore 20. The pin 21 is adapted to be moved upwardly as far as is necessary, but it is normally seated as low as possible in the bore 19. Spaced from the depending bracket arms 17 is a shorter depending arm 23 which is likewise formed integral with the substantially rectangular plate 14, and is adapted to receive a bolt 24 through which is formed an aperture 25 extending longitudinally therethrough.

The numeral 25' designates an air line which is provided with a valve 26, which is connected to the bolt 24. An arm 27 is connected to the valve stem 28 of the valve 26 of the air line 25', said pivoted arm 27 being adapted to be pivotally operated over the opening of the bore 19 in the sleeve 18, and to allow for this movement, a cut out portion 29 is provided in one of the depending bracket arms 17, and in the sleeve portion 18. It will thus be seen that my plate 14 is adapted to be connected to the lower side of the axle box 13 by means of the bolts 16, thereby causing the pin 21 to be in such a position that if the wheels 10 should become accidentally derailed the pin would be caused to contact with the rail, 11, thereby forcing the same through the bore 19, in the sleeve 18, whereby the upper end of the pin 21 will contact with the pivoted arm 27, thereby opening the air valve which will set the brakes in the air system, thereby causing the train to be automatically stopped.

In Figures 5, 6 and 7 of the drawings, is shown a modification of my invention whereby it is adapted to be used in conjunction with an axle boxing 13 when said axle boxing 13 is provided with a curved bottom plate. A curved plate 30, corresponding to the plate 14 in the first form is adapted to be mounted on the lower plate of the axle boxing 13 and to be held in place by means of the bolts 31. Depending from the curved plate 30 are the arms 32, provided with the sleeve 33, in which is adapted to operate the pin 34. The depending arm 35 is mounted on the lower side of the curved plate 30, in spaced relation to the arms 32 and is adapted to receive a bolt 36 which is provided with a longitudinally extending bore, which forms a seat for the air line valve which is connected at its opposite end in the air brake system. An arm 37 is keyed to the end of the air valve stem, said arm 37 being adapted to overlie the bore formed in the sleeve 33. It will thus be seen that when the pin 34 is moved upwardly the arm 37 will be caused to open the air valve thereby setting the brakes in the air brake system.

It will thus be seen that I have devised a very efficient form of automatic means whereby if the vehicle is derailed the brakes will be immediately applied and the train stopped without the possibility of the train becoming injured or the rails torn up or other injuries which normally occur due to the fact that the train is not stopped. The device may be provided on each side of a car, so that it will be put into operation when derailment occurs on either side of the track.

It is to be understood that the form of my invention herewith shown and described is to be taken as the preferred embodiment of the same, and that various changes in the shape, size and arrangement of parts may be resorted to, without departing from the spirit of my invention or the scope of the subjoined claims.

Having thus described my invention, I claim:—

1. In combination with a vehicle adapted to run on a track including an axle, wheels mounted on said axle, an axle box, an air brake system, a pin mounted on said axle box adapted to contact with said rail to operate a valve in said air brake system.

2. In combination with a vehicle adapted to run on a track including an axle, wheels mounted on said axle, an axle box, an air brake system, a sleeve carried by said axle box and a pin adapted to operate within said sleeve to operate a valve in said air brake system.

3. In combination with a vehicle adapted to run on a track including an axle, wheels mounted on said axle, an axle box, an air brake system, a plate mounted on said axle box, a sleeve carried by said plate, a pin adapted to reciprocate within said sleeve, and to contact with said track to operate a valve in said air brake system.

4. In combination with a vehicle adapted to run on a track including an axle, wheels mounted on said axle, an axle box carried by the end of said axle, and an air brake system, a plate adapted to be mounted on said axle box, depending bracket arms made integral with said plates, a sleeve carried by said depending bracket arms, a pin mounted in the bore of said sleeve, and adapted to contact with said rail to operate the valve in the air brake system.

5. In combination with a vehicle adapted to run on a track including an axle, wheels mounted on said axle, an axle box mounted on the ends thereof, and an air brake system, a plate mounted on said axle box, depending bracket arms made integral with said plate, a sleeve carried by said depending bracket arms, a depending arm mounted on said plate in spaced relation to said depending bracket arms, a bolt provided with a bore carried by said depending arm, an air valve connected to one end of said bolt, an arm carried by the stem of said air valve, and a pin adapted to operate within said sleeve, and adapted to contact with said arm.

6. In combination with a vehicle adapted to run on a track, including an axle, wheels mounted on said axle, an axle box carried on each end thereof, and an air brake system, a plate carried by said axle box, depending bracket arms made integral with said plate, a sleeve carried by said depending bracket arms, a pivoted arm connected to a valve in said system, and a pin adapted to contact with said track and to operate said arm.

In testimony whereof I affix my signature in presence of two witnesses.

FLORAIN D. BABCOCK.

Witnesses:
 A. R. JOHNSON,
 L. E. MARK.